US012654237B2

(12) United States Patent
Gey

(10) Patent No.: US 12,654,237 B2
(45) Date of Patent: Jun. 16, 2026

(54) CUTTING TOOL WITH PRESSURE SENSOR

(71) Applicant: KENNAMETAL INC., Latrobe, PA (US)

(72) Inventor: Christoph Gey, Neuhausen (CH)

(73) Assignee: KENNAMETAL INC., Latrobe, PA (US)

( * ) Notice: Subject to any disclaimer, the term of this patent is extended or adjusted under 35 U.S.C. 154(b) by 663 days.

(21) Appl. No.: 18/107,316

(22) Filed: Feb. 8, 2023

(65) Prior Publication Data

US 2023/0264272 A1 Aug. 24, 2023

(30) Foreign Application Priority Data

Feb. 18, 2022 (DE) .......................... 102022103901.3

(51) Int. Cl.
*B23B 49/00* (2006.01)
*B23B 51/06* (2006.01)

(52) U.S. Cl.
CPC ........ *B23B 49/001* (2013.01); *B23B 2270/48* (2013.01)

(58) Field of Classification Search
CPC ............ B23B 2228/10; B23B 2228/48; B23B 2260/144; B23B 27/16; B23B 27/14; B23B 49/001; B23B 51/00; B23B 51/003; B23B 51/02; B23B 51/068; B23C 5/006; B23C 5/16; B23Q 17/0957; B23Q 11/00
See application file for complete search history.

(56) References Cited

U.S. PATENT DOCUMENTS

| | | | | |
|---|---|---|---|---|
| 2,575,173 A | * | 11/1951 | Johnson .................. | E21B 47/00 175/50 |
| 2,657,909 A | * | 11/1953 | Bielstein ................. | E21B 12/02 175/317 |
| 2,658,724 A | * | 11/1953 | Arps ....................... | E21B 47/00 73/152.19 |
| 3,077,802 A | * | 2/1963 | Philip ...................... | D01F 4/00 83/16 |
| 3,571,877 A | * | 3/1971 | Zerkle ................ | B23Q 11/1046 407/11 |
| 5,829,926 A | * | 11/1998 | Kammermeier ... | B23Q 11/1023 408/59 |

(Continued)

FOREIGN PATENT DOCUMENTS

| | | | | | |
|---|---|---|---|---|---|
| GB | 2193453 A | * | 2/1988 | ............. | B23Q 11/10 |
| KR | 101742947 B1 | * | 6/2017 | ......... | B23B 51/0453 |
| WO | WO-2015117079 A1 | * | 8/2015 | ......... | B23Q 11/1015 |

OTHER PUBLICATIONS

Nov. 22, 2024 Foreign Office Action Chinese Application No. CN202310097787.7, 2 Pages.

*Primary Examiner* — Nicole N Ramos
(74) *Attorney, Agent, or Firm* — Christopher J. Owens

(57) ABSTRACT

A cutting tool comprising at least one cavity spaced apart from an outer contour of the cutting tool by a wear layer, wherein a thickness of the wear layer corresponds to a wear limit of the cutting tool, wherein the cavity is fluidly connected to a supply line arranged within the cutting tool and configured so as to provide a predetermined pressure in the cavity, wherein a pressure sensor fluidly connected to the supply line indicates a wear of the cutting tool when the thickness of the wear layer is reduced to the extent that a pressure change occurs within the supply line.

16 Claims, 6 Drawing Sheets

(56)                References Cited

U.S. PATENT DOCUMENTS

2011/0290560 A1*  12/2011  Buske ..................... E21B 12/02
                                                                175/39
2021/0079734 A1*   3/2021  Azrak Fruet  .......... E21B 10/60

* cited by examiner

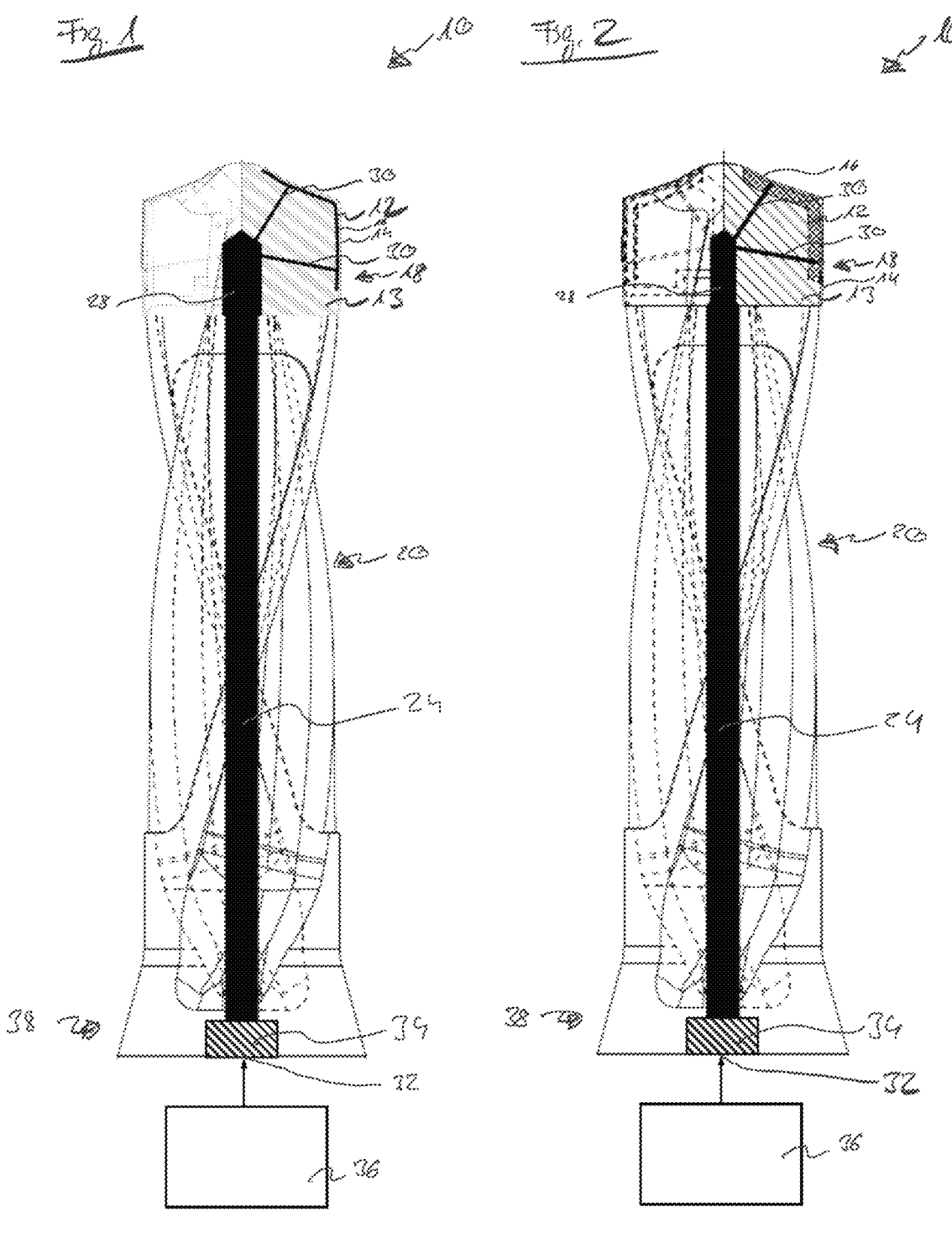

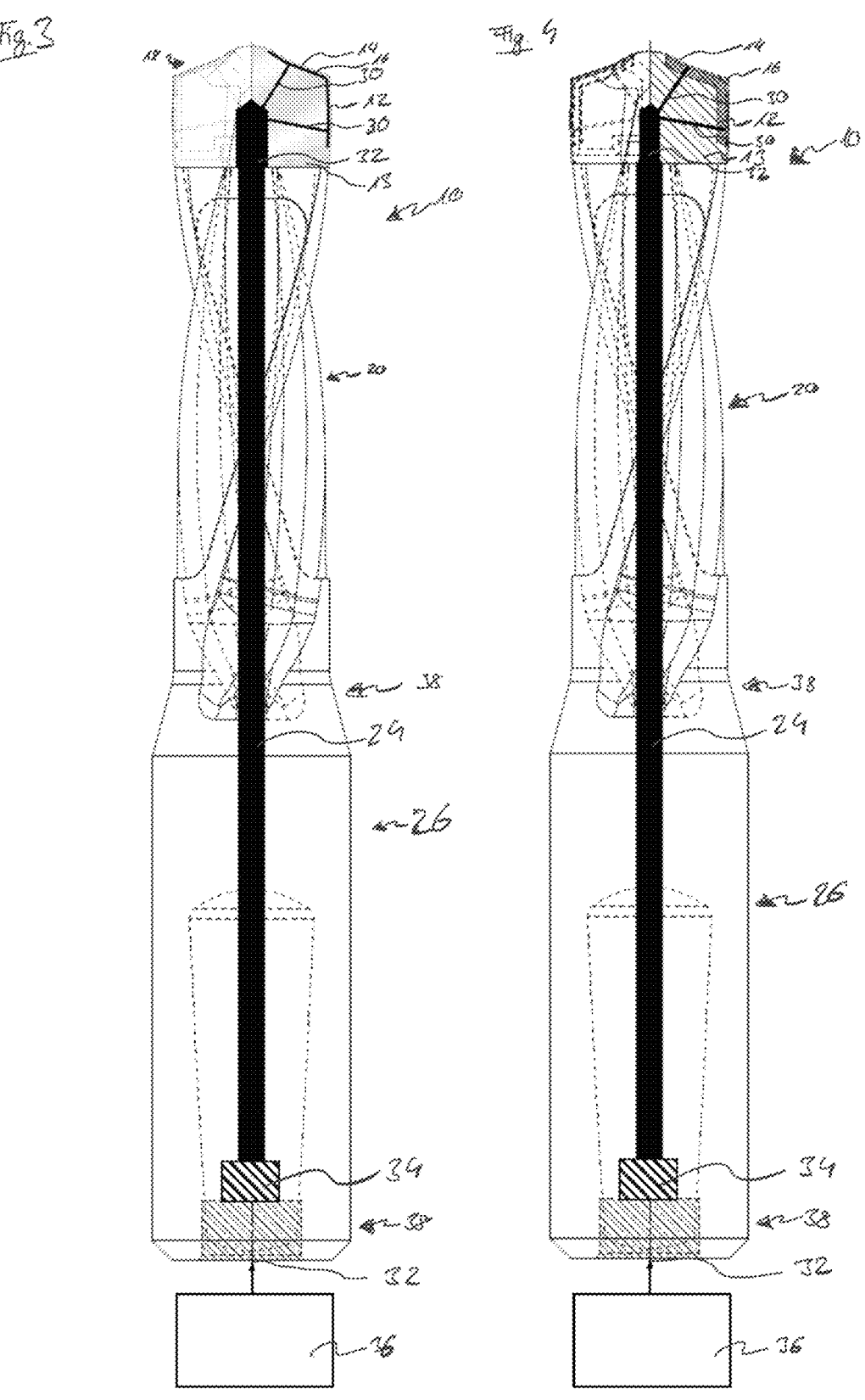

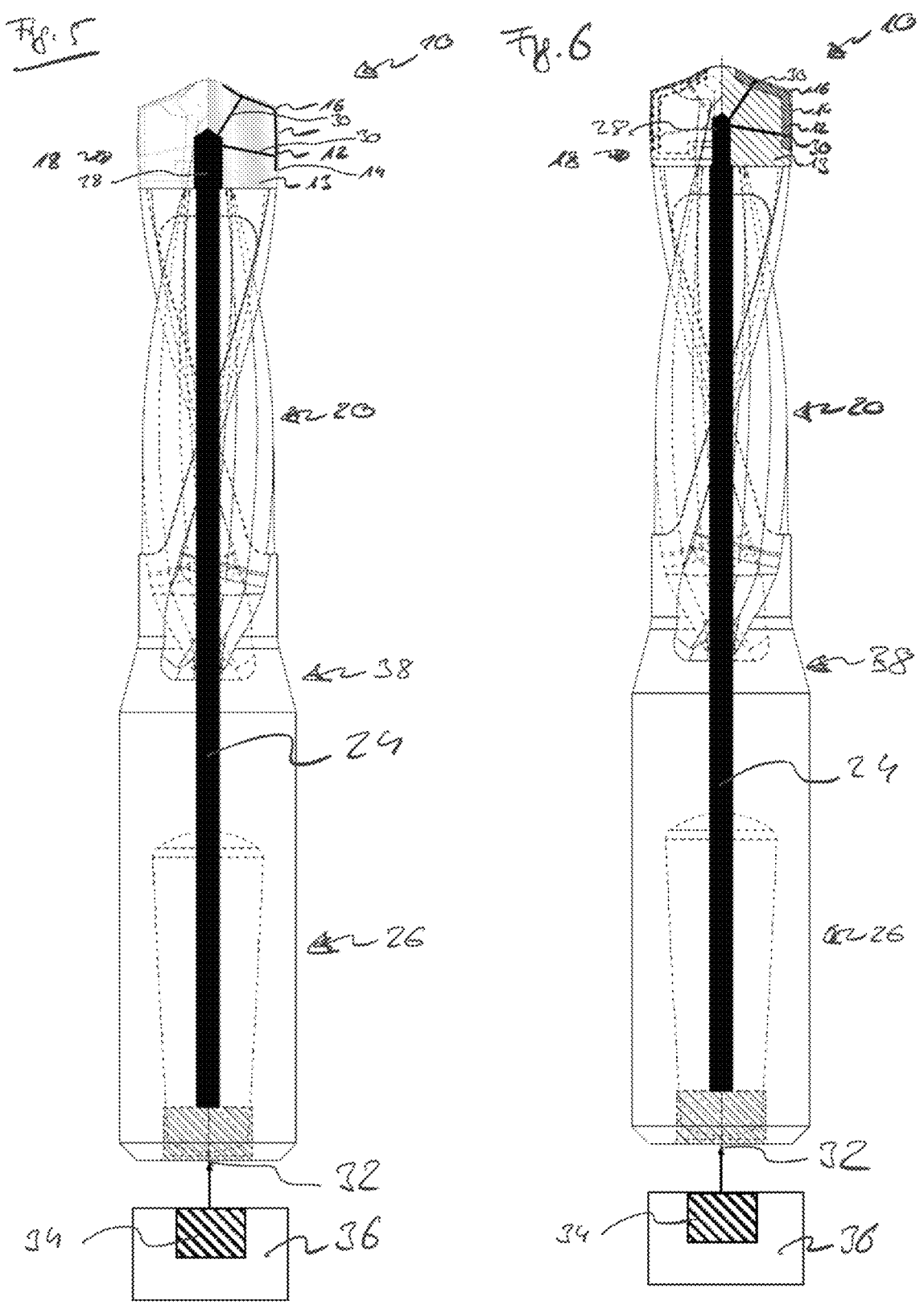

CUTTING TOOL WITH PRESSURE SENSOR

RELATED APPLICATION DATA

The present application claims priority pursuant to 35 U.S.C. § 119(a) to German Patent Application Number 102022103901.3 filed Feb. 18, 2022 which is incorporated herein by reference in its entirety.

FIELD

The invention relates to a cutting tool.

BACKGROUND

Typically, cutting tools are used for the machining of workpieces. Through direct contact with the workpiece to be machined, a cutting tool wears over time. If wear on a cutting tool has progressed to the point that it can no longer perform its function properly, this cutting tool will typically need to be replaced.

Because a worn-out cutting tool can no longer fully perform its task and can even damage the surface of the workpiece to be machined, it is desirable to detect the wear of a cutting tool in a timely manner. If the operator recognizes the wear in a timely manner, he or she can undertake timely countermeasures, such as regrinding or replacing the cutting tool.

To reliably determine the wear of a cutting tool, the cutting tool suspected of wear can be structurally assessed under an optical light microscope. In this way, possible damage to the chipping surface, free surface, or cutting edges can be detected. However, the assessment under such a microscope is time-consuming and thus cost-intensive. In addition, the correct time of the assessment must be selected by an operator. However, this time is different depending on the use of the cutting tool and cannot always be clearly determined in advance. Furthermore, the microscopic assessment requires the removal of the cutting tool, which is also a time-consuming and thus cost-intensive process.

Consequently, it is desirable to determine the wear of a cutting tool during operation in a simple and inexpensive manner.

One option is the use of wear indicators. Known in the prior art, these are installed, for example, on drill heads that are configured for oil drilling.

US 2011/0290560 A1 and US 2021/0079734 A1 disclose wear indicators for such drill heads. These include a drill head having a cutting surface and a channel arranged below the cutting surface. Due to wear, the cutting surface can be removed and the channel can be opened so that any drilling fluid flowing through the drill head can exit the drill head via the now open channel. This changes at least one characteristic of the flow of drilling fluid that can be detected by a sensor unit on an oil platform connected to the drill head. However, this wear detection method is effort-intensive and not very space-saving and is therefore not suitable for every cutting tool. In particular, this method cannot be readily applied to smaller-sized cutting tools that are used for the machining of workpieces.

SUMMARY

The invention therefore addresses the problem of determining the wear of a cutting tool in a cost-effective and simple manner.

The problem is solved according to the invention by a cutting tool according to claim 1.

Advantageous embodiments of the cutting tool according to the invention are specified in the subclaims, which can optionally be combined with one another.

According to the invention, the problem is solved by a cutting tool comprising at least one cavity spaced apart from an outer contour of the cutting tool by a wear layer, wherein a thickness of the wear layer corresponds to a wear limit of the cutting tool, characterized in that the cavity is fluidly connected to a supply line arranged within the cutting tool and configured so as to provide a predetermined pressure in the cavity, wherein a pressure sensor fluidly connected to the supply line indicates a wear of the cutting tool when the thickness of the wear layer is reduced to the extent that a pressure change occurs within the supply line.

The invention is based on the core concept of arranging a cavity in a cutting tool against which a predetermined pressure pushes and which is opened upon sufficient wear of the cutting tool. As a result, there is a fluid connection between the now opened cavity and the atmosphere surrounding the cutting tool. In this way, a pressure drop occurs in the cavity or also a pressure rise if a negative pressure has been generated in the cavity, wherein the pressure in the cavity adjusts to the ambient pressure. This pressure change can be easily detected by a pressure sensor.

The proposed cutting tool has the technical advantage that a wear can be determined directly by measuring a change in pressure in the cutting tool.

Pressure measurements are already known for various purposes and are therefore inexpensive.

In addition, the proposed cutting tool does not require the use of additional liquids or substances as required in the prior art for known wear indicators.

According to one aspect, there is a vacuum in the cavity such that, in the case of wear, the pressure in the supply line rises.

The advantage in this embodiment is that no additional pressurized gases need be conducted into the cutting tool. Thus, no further components, such as a pressurized gas cylinder, are required. The vacuum can also be easily generated by connecting a vacuum pump to the supply line, for example a rotary slide.

A vacuum is understood herein to mean a pressure in the cavity that is lower than the ambient pressure of the cutting tool. For example, the pressure can be 0.1 bar.

Preferably, the vacuum should be sufficient in order to measure a change in pressure.

In a further embodiment, there is a positive pressure in the cavity such that, in case of wear, the pressure in the supply line drops.

The advantage in using a positive pressure is that it can be realized more easily than a vacuum or a negative pressure in the cavity. For this purpose, a pressurized gas cylinder can simply be connected to the cutting tool. A positive pressure in the cutting tool can then be adjusted via a pressure reducer.

A positive pressure is understood herein to mean a pressure in the cavity that is higher than the ambient pressure of the cutting tool.

The positive pressure in the cavity preferably lies within a range from 1.05 to 2 bar, particularly preferably 1.5 bar.

Depending on the application, a vacuum or a positive pressure in the cutting tool can be selected.

The pressure change in the case of wear can occur via a pressure measurement within the supply line. The pressure in the supply line can be measured either absolutely or relatively.

The pressure sensor is preferably selected from the group consisting of bridge-based, capacitive, and piezo-electric pressure sensors.

Particularly preferably, the pressure sensor is a capacitive pressure sensor. This type of sensor is based on changing a capacity between a metal membrane and a solid metal plate. The capacity changes when a distance between the metal plate and the metal membrane changes as a result of a pressure effect on the metal membrane. Moreover, capacitive pressure sensors are advantageously insensitive to shock and vibration.

Suitable examples for pressure sensors are capacitive pressure sensors as offered by Keller AG for printing technology (Winterthur, Switzerland).

The pressure sensor can be arranged in the cutting tool or externally, as long as the pressure sensor maintains fluid contact to the supply line.

In principle, the invention is not limited in relation to the formation of the cavity. The cavity can have any shape and geometry as long as it can be placed in a cutting tool and does not compromise the structural integrity of the cutting tool.

According to a further aspect, it is provided that the cavity is configured as a channel.

The configuration of the cavity in the form of a channel offers the technical advantage that the wear can be monitored with a single cavity over a wide area of the surface or the outer contour.

In a further embodiment, the cavity has a porous structure, in particular a porous honeycomb-like structure.

The formation of a porous structure, in particular a porous honeycomb-like structure, offers the technical advantage that a cutting tool with a porous cavity has higher structural integrity than a comparable cutting tool with an "empty" cavity.

In a further embodiment, the cutting tool comprises at least one cutting edge and a cutting surface. Advantageously, it is provided that the cavity is associated with the cutting edge and/or the cutting surface. Thus, the wear is detected directly on the most stressed portions of the cutting tool, i.e., the cutting surface and the cutting edge.

A cutting edge is understood to mean all edges of a cutting tool, in particular the main cutting edge, side cutting edge, and cutting corner.

In particular, the term "cutting surface" includes the free surface and the chipping surface.

In a further embodiment, a plurality of cutting edges and cavities are provided, wherein at least one cavity is associated with each cutting edge.

In a further embodiment, a plurality of cutting surfaces and a plurality of cavities are provided, wherein at least one cavity is associated with each cutting surface.

The two embodiments mentioned above offer the technical advantage that the wear of individual cutting surfaces and cutting edges can be specifically detected.

According to a further aspect, the cutting tool is modularly constructed and comprises a cutting insert in which the cavity is provided.

Upon wear of the modular cutting insert, a change in pressure is determined, as already described above. Thus, the worn cutting insert can either be tipped or completely replaced in order to regain a properly functioning cutting tool.

The cutting insert can in particular be a tipped cutting plate or a drill head.

In a further aspect, the cutting tool is coupled to a tool holder such that the supply line of the cutting tool is fluidly connected to a further supply line of the tool holder.

Advantageously, the pressure sensor is arranged in the tool holder. This offers the advantage that the tool holder can be equipped with various pressure sensors, which can be fluidly coupled to the supply line of the cutting tool depending on the purpose. Furthermore, the tool holder also offers sufficient space in order to accommodate a pressure sensor and the necessary electronics.

Further, a cutting tool is proposed that can be obtained by a 3D printing method, wherein the method comprises the following steps:

a) providing a metal powder, in particular a carbide powder, b) 3D printing a cutting tool comprising at least one cavity using the metal powder and thus forming a cutting tool green compact, and c) sintering the cutting tool green compact to create a 3D-printed cutting tool.

The method described above allows cavities to be created directly during manufacture in the cutting tool without additional components and aids.

The invention further relates to a machine tool for operating a cutting tool according to any of the preceding claims, wherein the machine tool contains a pressure source for generating a vacuum or positive pressure, wherein the pressure source is fluidly connected to the supply line of the cutting tool and/or the tool holder.

This embodiment offers the technical advantage that the pressure source required in order to generate a vacuum and positive pressure can be accommodated in the machine tool in a space-saving manner. A separate arrangement of the pressure source is thus omitted.

Advantageously, the pressure sensor is also arranged in the machine tool. The pressure sensor can thus be arranged in close proximity to the pressure source. In addition, the cutting tool or drill head, shaft, and tool holder can be free of any sensor technology so that these components can be completely accommodated in the machine tool.

Thus, in case of wear on the cutting tool, only the cutting tool can be replaced without also discarding the pressure sensor upon replacement.

BRIEF DESCRIPTION OF THE DRAWINGS

The invention will be described in further detail below with reference to the accompanying drawings, using exemplary embodiments. The drawings show:

FIG. 1 in a schematic cross-sectional view, a cutting tool according to the invention having a channel-like cavity;

FIG. 2 in a schematic cross-sectional view, the cutting tool from FIG. 1 having a honeycomb-like cavity;

FIG. 3 in a schematic cross-sectional view, the cutting tool from FIG. 1 having a tool holder;

FIG. 4 in a schematic cross-sectional view, the cutting tool from FIG. 2 having a tool holder;

FIG. 5 in a schematic cross-sectional view, the cutting tool from FIG. 3 with a different arrangement of the pressure sensor;

FIG. 6 in a schematic cross-sectional view, the cutting tool from FIG. 4 with a different arrangement of the pressure sensor;

FIG. 10 in a schematic cross-sectional view, a modular cutting tool having a honeycomb-like cavity.

DETAILED DESCRIPTION

Figure 7:
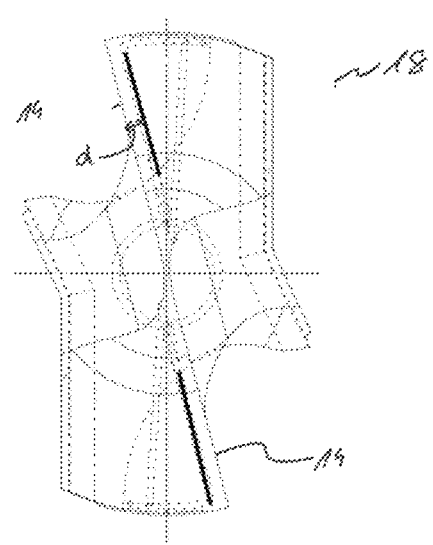
FIG. 7 in a schematic aerial view, a drill head from FIGS. 1, 3, and 5.

FIG. 1 shows a cutting tool 10 for performing rotating cutting operations on a workpiece (not shown).

The cutting tool described in relation to FIG. 1 and in the following figures is provided by way of example only. Generally, the cutting tool can be any cutting tool known in the prior art, such as a milling machine, cutting plate, or rotary tool.

In the illustrated embodiment, the cutting tool 10 is of the spiral drill type and has helical grooves arranged along the sides of the drill.

The cutting tool 10 comprises a drill head 18 configured integrally with a shaft 20.

The shaft 20 has an elongated shape with two opposing ends, wherein the shaft 20 opens into the drill head 18 with one end and has a coupling portion 38 at the other end.

The drill head 18 has an outer contour 14 that corresponds to the surface of the drill head 18.

According to the invention, the drill head 18 comprises a cavity 12.

The cavity 12 is located in the cutting body 13 of the drill head 18.

The cavity 12 is spaced apart from the outer contour 14 by a wear layer 16.

The cavity 12 is configured in a channel-like manner and extends from the tip of the drill head 18 in the direction of its lateral end.

The channel-like cavity 12 is fluidly connected via two connecting channels 30 to a distribution chamber 28 arranged proximally in the drill head 18.

The connecting channels 30 extend from the proximally arranged distribution chamber 28 to the distally arranged cavities 12.

The distribution chamber 28 is fluidly connected to a supply line 24. The supply line 24 extends from the distribution chamber 28 through the shaft 20, wherein the supply line 24 is evenly spaced apart from the outer wall of the shaft 20. The latter subsequently opens into an interface 32 associated with the coupling portion 38.

The coupling portion 38 further comprises a pressure sensor 34 fluidly connected to the supply line 24. Advantageously, the pressure sensor is associated with the interface 32.

Particularly preferably, the pressure sensor 34 is a capacitive pressure sensor.

The coupling portion 38 is configured so as to be coupled to a tool holder. For this purpose, it can be equipped with corresponding grid elements (not shown here) to enable coupling.

Further, at the coupling portion 38, the supply line 24 is fluidly connected to a pressure source 36.

The pressure source 36 is configured so as to generate a positive pressure or a vacuum in the supply line 24. Thus, a positive pressure or a vacuum is also present in the cavity 12. The pressure source 36 can in particular be a pump.

The pressure source 36 is preferably arranged outside of the cutting tool 10.

The wear on the cutting tool 10 of FIG. 1 will be explained in further detail below.

In operation, the cutting tool 10 performs rotating cutting operations on a workpiece, thereby causing a wear on the outer contour 14 of the drill head 18. As a result of the wear, the wear layer 16 is removed and the cavity 12 is opened. It is sufficient for the wear layer 16 to be removed in at least one place. Uneven wear therefore also results in the cavity 12 being opened in at least one place. As a result, there is a pressure change in the cavity 12 and thus in the supply line 24. This change in pressure can be measured by the pressure sensor 34, whereupon it generates a signal and passes it to an operator. The operator receives the information that the wear limit of the cutting tool 10 has been reached. Operation can be suspended and the cutting tool 10 can be replaced. A time-consuming and cost-intensive monitoring under a microscope can thus be avoided.

FIG. 2 shows the cutting tool 10 of FIG. 1, with the difference that the cavity 12 is honeycomb-like.

With respect to the other features and parts, the same statements apply as those already made in relation to FIG. 1.

FIG. 3 shows the cutting tool 10 of FIG. 1 with a tool holder 26. Otherwise, FIG. 3 contains the same components as already described in relation to FIG. 1.

The tool holder 26 is connected between the interface 32 and the pressure source 36 from FIG. 1. The two are fluidly connected to one another by a further supply line 24 arranged in the tool holder 26.

The tool holder 26 is latched to the coupling portion 38 of the shaft 20 such that a gas-tight supply line 24 is formed, which opens from the distribution chamber 28 through the shaft 20 into the tool holder 26. The supply line 24 in the tool holder 26 is connected to the pressure source 36 via an interface 32.

FIG. 4 shows the cutting tool of FIG. 3 with the difference that the cavity 12 forms a porous honeycomb-like structure. Otherwise, FIG. 4 contains the same components as already described in relation to FIG. 3.

FIG. 5 shows the cutting tool 10 of FIG. 3, with the difference that the pressure sensor 34 is arranged outside of the cutting tool 10.

The pressure sensor 34 can be associated with the pressure source 36.

In particular, the pressure sensor 34 can be accommodated together with the pressure source 36 in a machine that drives the cutting tool 10.

FIG. 6 shows the cutting tool of FIG. 4, with the difference that the pressure sensor 34 is arranged outside the cutting tool 10, as already explained in relation to FIG. 5. Otherwise, FIG. 6 contains the same components as already described in relation to FIG. 4.

FIG. 7 shows an aerial view of a drill head 18 from FIGS. 1, 3, and 5.

As can be readily seen in FIG. 7, the channel-like cavity 12 is spaced apart from the outer contour 14 of the drill head 18 by a wear layer 16. The wear layer 16 has a thickness d. The thickness d of the wear layer 16 corresponds to a wear limit of the cutting tool 10.

Figure 8:
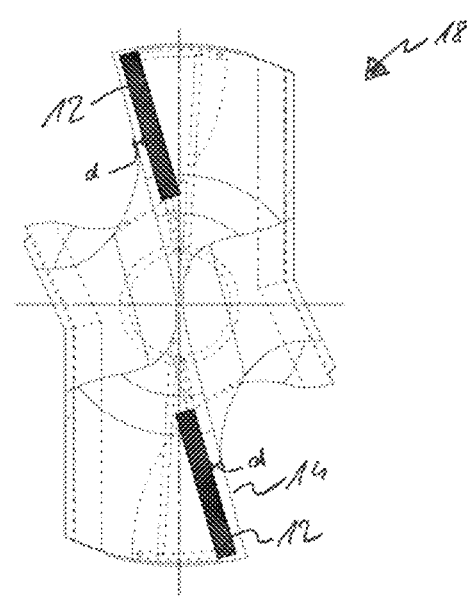
FIG. 8 in a schematic aerial view, a drill head from FIGS. 2, 4, and 6.

FIG. 8 shows an aerial view of the drill head 18 of FIGS. 2, 4, and 6. The thickness d shown in FIG. 8 also corresponds to the thickness of the wear layer 16.

Figure 9:
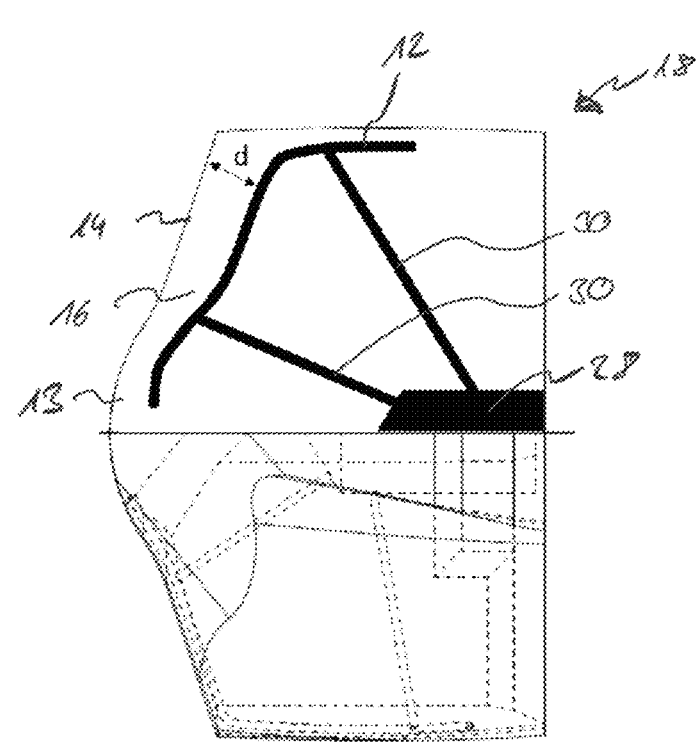
FIG. 9 in a schematic cross-sectional view, the drill head from FIGS. 1, 3, and 5.
Figure 16:
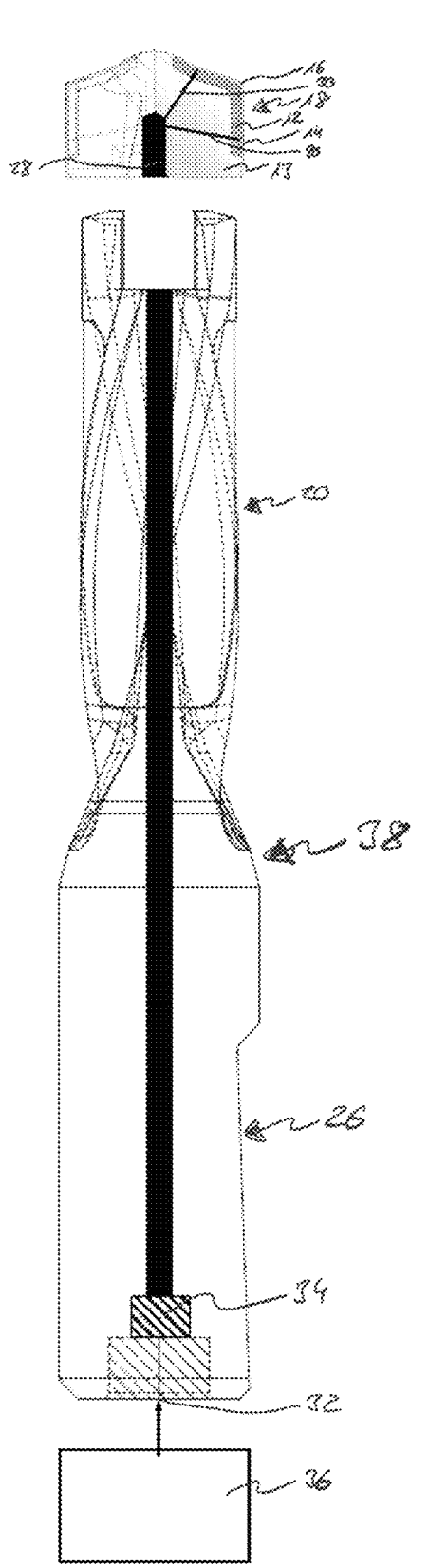

FIG. 9 shows an enlarged view of the drill head 18 from FIGS. 1, 3, and 5. Moreover, the cutting tool 10 of FIG. 9 contains the same components and features as already described in relation to FIGS. 1, 3, and 5.

As can be readily seen in FIG. 9, the channel-like cavity 12 is spaced apart from the outer contour 14 of the cutting tool 10, in particular the drill head 18, by a wear layer 16 having the thickness d.

The wear layer 16 corresponds in particular to a wear limit of the cutting tool 10. In other words, if the wear layer is selected larger, then the wear of the cutting tool 10 is indicated only after a longer period of operation. Conversely, if the wear layer 16 is reduced, the operating time after which wear is indicated is also reduced.

FIG. 10 shows a modular cutting tool 22.

The modular cutting tool 22 comprises a disposable drill head 18 attached to and engaged with the shaft 20.

Moreover, the modular cutting tool 22 contains the same components as already described in relation to FIG. 2. In this respect, reference is made to the descriptions for FIG. 2.

LIST OF REFERENCE NUMERALS

10 Cutting tool
12 Cavity
13 Cutting body
14 Outer contour
16 Wear layer
18 Drill head
20 Shaft
22 Modular cutting tool
24 Supply line
26 Tool holder
28 Distribution chamber
30 Connecting channel
32 Interface
34 Pressure sensor
36 Pressure source
38 Coupling portion
d Thickness of the wear layer

The invention claimed is:

1. A cutting tool comprising at least one cavity spaced apart from an outer contour of the cutting tool by a wear layer, wherein a thickness of the wear layer corresponds to a wear limit of the cutting tool, wherein the cavity is fluidly connected to a supply line arranged within the cutting tool and configured so as to provide a predetermined pressure in the cavity, wherein a pressure sensor fluidly connected to the supply line indicates wear of the cutting tool when the thickness of the wear layer is reduced to the extent that a pressure change occurs within the supply line;

the predetermined pressure being a pressure such that a vacuum is present in the cavity at the predetermined pressure;

the pressure sensor configured to detect a rise in pressure in the cavity that is greater than the predetermined pressure to detect the wear of the cutting tool.

2. The cutting tool according to claim 1, wherein the wear of the cutting tool is detected at ambient pressure.

3. The cutting tool according to claim 1, wherein the wear of the cutting tool is detected at a value of greater than 0.1 bar.

4. The cutting tool according to claim 1, wherein the cavity is configured as a channel and/or a porous structure.

5. The cutting tool of claim 4, wherein the cavity is configured as a porous honeycomb structure.

6. The cutting tool according to claim 5, wherein a plurality of cutting edges and a plurality of cavities are provided, wherein at least one cavity is associated with each cutting edge.

7. The cutting tool according to claim 5, wherein a plurality of cutting surfaces and a plurality of cavities are provided, wherein at least one cavity is positioned adjacent to each cutting surface.

8. The cutting tool according to claim 1, wherein the cutting tool comprises at least one cutting edge and a cutting surface, wherein the cavity is positioned adjacent to the cutting edge and/or the cutting surface.

9. The cutting tool according to claim 1, wherein the cutting tool is modularly constructed and comprises a cutting insert, in which the cavity is provided.

10. The cutting tool according to claim 1, wherein the cutting tool is coupled to a tool holder such that the supply line of the cutting tool is fluidly connected to a further supply line of the tool holder.

11. The cutting tool according to claim 10, wherein the pressure sensor is arranged in the tool holder.

12. The cutting tool of claim 1, wherein the cutting tool is coupled to a tool holder such that the supply line of the cutting tool is fluidly connected to a further supply line of the tool holder and wherein the pressure sensor is fluidly connected to the further supply line of the tool holder.

13. The cutting tool of claim 1, wherein the wear of the cutting tool is detected at a value of greater than or equal to 1 bar.

14. The cutting tool of claim 1, wherein the predetermined pressure is no more than 0.1 bar.

15. A machine tool for operating a cutting tool according to claim 1, wherein the machine tool contains a pressure source for generating a vacuum and wherein the pressure source is fluidly connected to the supply line of the cutting tool.

16. The machine tool according to claim 15, wherein the pressure sensor is arranged in the machine tool.

\* \* \* \* \*